No. 674,274.  
J. LUNZ.  
BAND CUTTER AND FEEDER FOR THRESHING MACHINES.  
(Application filed July 31, 1900.)  
(No Model.)  
Patented May 14, 1901.  
2 Sheets—Sheet 1.

WITNESSES:
Jos. A. Ryan
Amos W. Hart

INVENTOR
John Lunz.
BY Munn & Co.
ATTORNEYS

No. 674,274. Patented May 14, 1901.
J. LUNZ.
BAND-CUTTER AND FEEDER FOR THRESHING MACHINES.
(Application filed July 31, 1900.)
(No Model.) 2 Sheets—Sheet 2.
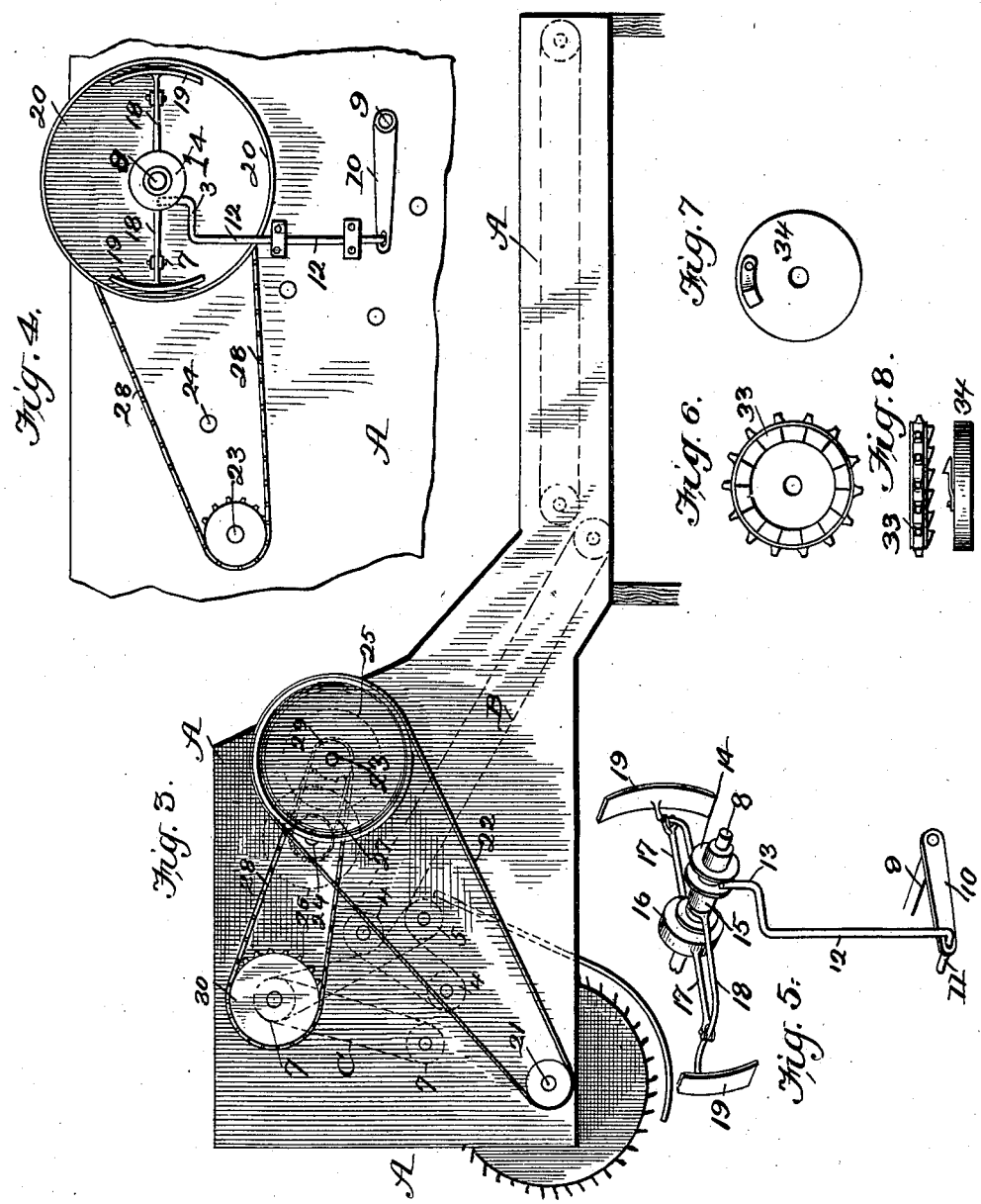
WITNESSES:
Jos. A. Ryan
Amos W. Hart
INVENTOR
John Lunz
BY Munn &Co.
ATTORNEYS
THE NORRIS PETERS CO., PHOTO-LITHO., WASHINGTON, D. C.

UNITED STATES PATENT OFFICE.

JOHN LUNZ, OF SANDCREEK, OKLAHOMA TERRITORY.

BAND-CUTTER AND FEEDER FOR THRESHING-MACHINES.

SPECIFICATION forming part of Letters Patent No. 674,274, dated May 14, 1901.

Application filed July 31, 1900. Serial No. 25,436. (No model.)

*To all whom it may concern:*

Be it known that I, JOHN LUNZ, of Sandcreek, in the county of Billings, Territory of Oklahoma, have invented a new and Improved Band-Cutter and Feeder for Threshing-Machines, of which the following is a specification.

My invention is an improvement in the class of machines provided with one or more endless traveling aprons or belts for conveying bundles or sheaves of grain to a toothed threshing-cylinder and with rotatable cutters for severing the bands of such bundles or sheaves when passing beneath them.

My invention relates particularly to the means for regulating the rapidity with which the grain is fed to the threshing-cylinder. The speed of the latter is usually relied on for such regulation; but in my machine it is effected by the amount of grain deposited on the endless conveyer or carrier, which is chiefly relied upon to feed it to the cylinder. In connection with such conveyer I employ another, the arrangement being such that it is adapted to swing backward in a vertical plane in case a large amount of grain passes between it and the main conveyer. In connection with such swinging conveyer I employ a clutch mechanism that automatically regulates its speed. In addition to these features I have devised a new arrangement of circular band-cutters, whereby they spread the grain as it is loosened from the bundles or sheaves.

The details of the construction, arrangement, and combination of parts are as hereinafter described.

Figure 1:
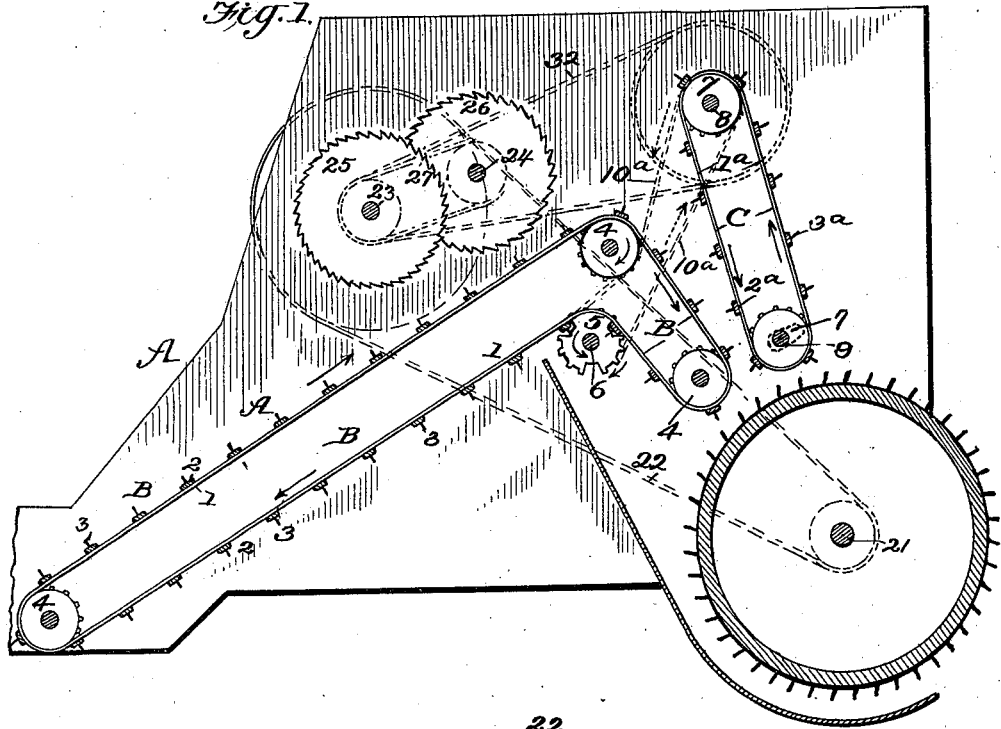
Figure 2:
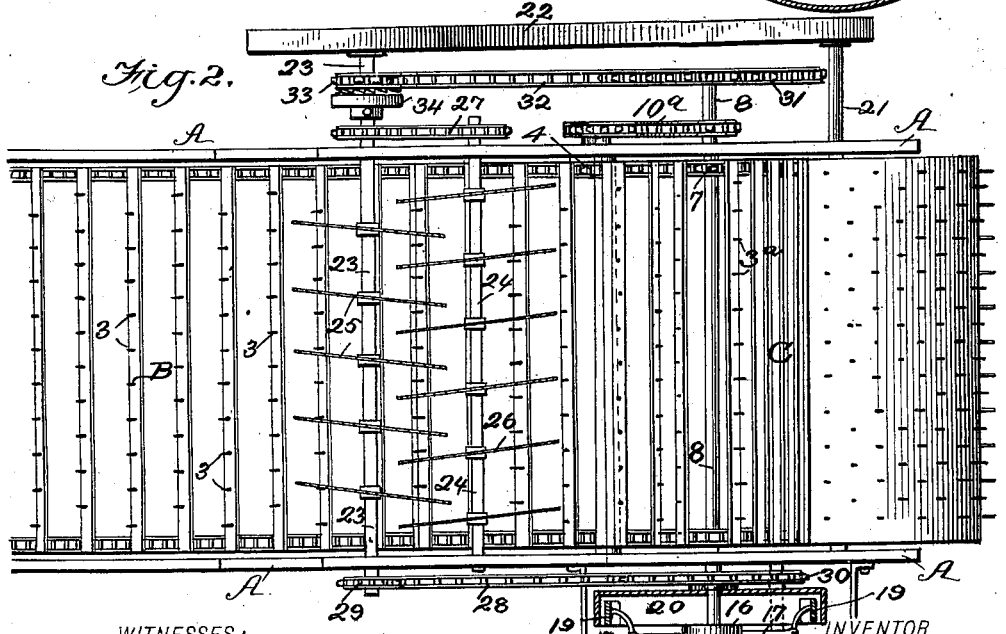

In the accompanying drawings, Figure 1 is a side view of my improved machine. Fig. 2 is a plan view. Fig. 3 is another side view of the machine. Fig. 4 is a side view of a portion of the machine, showing the clutch mechanism enlarged. Fig. 5 is a perspective view of a part of the clutch mechanism. Fig. 6 is a face view of a combined sprocket and ratchet wheel. Fig. 7 is a face view of another ratchet-wheel. Fig. 8 is a plan view of the two wheels shown in Figs. 6 and 7.

The movable parts of the machine are arranged in a frame or casing A. The gavels or bound bundles of grain are delivered upon the long conveyer B, the outer portion of which is arranged at an upward inclination of about forty-five degrees and its inner and shorter portion at a downward inclination of forty-five degress. This conveyer B is formed of chains 1 and cross-slats 2, having teeth 3, as shown. The chains 1 run on sprockets 4 and 5, those indicated by 5 being arranged at the inner angle of the conveyer and mounted upon a shaft 6. They are shown provided with peripheral notches to receive the slats 2. A second but shorter conveyer C is arranged at a slight vertical angle opposite and above the shorter portion of the conveyer B and is similarly constructed of chains $1^a$ and toothed slats $2^a$, having teeth $3^a$. This conveyer C runs on sprockets 7, mounted on parallel rotatable shafts 8 and 9. An endless chain $10^a$ runs on sprockets on shafts 6 and 8, and its upper bight runs in contact with another sprocket on shaft 4. The direction of rotation is indicated by arrows, Fig. 1, and it is apparent that the longer and angular conveyer B is driven by said chain $10^a$ at the same speed as the shorter conveyer. The upper shaft 8 is fixed in position, while the lower one, 9, is adapted to move bodily laterally or toward and from the adjacent conveyer B. In other words, the short conveyer or feeder C is adapted to swing in a vertical plane from the upper shaft 8 and hangs normally slightly inclined to the vertical, but at a less angle than the short side of conveyer B. The shaft 9 is extended laterally, as shown in Figs. 2 and 5, and provided with an arm 10, that is loosely engaged with the lower crank-arm 11 of a rocking shaft 12, set vertically in a suitable frame. The upper crank-arm 13 of such shaft 12 works between two flanges 14 of a sleeve 15, which is adapted to slide and rotate freely on the shaft 8. A hub 16 is keyed on, and hence revolves with, said shaft. This hub has lateral arms 17, and to their ends are pivoted curved levers 18, carrying friction-pads 19, that are adapted to engage the inner side of the flanged wheel 20. The latter is fast with a sprocket-wheel and both are loose on shaft 9. This sprocket is driven as hereinafter described. The inner ends of said levers 18 are forked and loosely engage the slidable sleeve 15, before referred to.

It is apparent from the foregoing description that if the conveyer C swings backward its lower shaft 9 will pull on the lower crank-arm 11 of rock-shaft 12, thus rotating the latter sufficiently to slide the sleeve 15 outward, which movement will tilt the levers 18, and thus remove the pads 19 from contact with the flange of wheel 20. In other words, if a too-large amount of grain passes in between the conveyers B and C the lower end of the latter will be forced backward, and thereby operate to disengage the friction-clutch mechanism, and this results in slowing down the rapidity of feed and prevents overloading the threshing-cylinder, as will be further explained.

The cylinder-shaft 21 is the main drive-shaft of the machine. A belt 22 runs to the counter-shaft 23 or first saw-shaft and rotates it. A second parallel saw-shaft 24 is arranged adjacent to shaft 23. A set of circular saws 25 is keyed on shaft 23 at an inclination, and a similar set 26 is keyed on the adjacent shaft 24 at an opposite inclination. The saws of one set project into the spaces between the saws of the other, as shown in Fig. 2. The saws sever the bands of the gavels and then spread the grain by reason of their lateral sweep, due to their oscillation or wabbling movement as they rotate. The second saw-shaft 24 is driven from shaft 23 by a short belt 27.

As shown in Fig. 2, a chain 28 runs from a sprocket 29 on shaft 23 to a sprocket 30 on the shaft 8, that drives conveyer C. The flanged friction pulley or wheel 20 being fast to this sprocket 30, as before stated, it is to be seen that the conveyer C will be driven at a regular speed from the first saw-shaft 23 so long as the friction-clutch is engaged; but when the latter is disengaged the conveyer C is driven at a slower speed by mechanism arranged on the side of the machine opposite that on which the clutch is located.

A large sprocket-wheel 31 is keyed on the shaft 8, and a chain 32 runs therefrom to a small sprocket wheel or disk 33, mounted loosely on the first saw-shaft 23. This sprocket 33 has a ratchet-face, as shown in Figs. 7 and 8, and it is arranged close alongside a second ratchet-disk 34, that is keyed on shaft 23. The disk or wheel 34 has a series of clutch-teeth for engaging spring-teeth on sprocket 34. When the friction clutch-wheel 20 is engaged or locked to shaft 8, the loose ratchet 33 is driven faster than the normal speed of shaft 23, because the sprocket 31 is larger than 30, and hence the ratchet 33 overruns the ratchet 34; but when the clutch is disengaged the ratchet 34 has time to catch up with and engage the ratchet 33, and the latter then drives the shaft 8 and conveyer C through the medium of chain 32 and sprocket 31. The size of the latter is such that said shaft is driven slower than before, and hence the load is fed more slowly forward or between the two conveyers, which gives the cylinder time to thresh the grain properly. In other words, the cylinder is not overloaded, as it would be but for the slower feed effected by the shifting of the driving power from a small to a larger gear or sprocket, as above described.

It is obvious that the clutch may be arranged on either side of the machine.

The slats 2 and 2ª of the respective conveyers B and C are so arranged that a row of teeth on one conveyer intervene two rows on the other, whereby the grain is acted upon by said teeth to better advantage.

The apparatus feeds dry and rotten straw more fully than wet straw, which is retarded more or less, so that overloading the cylinder is prevented.

What I claim is—

1. In a band-cutter and grain-feeder, the combination with a conveyer whose inner or delivery end is inclined downward at a right angle to the front portion of a second conveyer arranged contiguous and opposite to such delivery end and adapted to swing in a vertical plane as described, a clutch mechanism mounted loose on the drive-shaft of the swinging conveyer, means connected with the swinging conveyer for operating the clutch, means for driving the conveyer at normal speed until released by the clutch, and other means for driving the conveyer at a slower speed when the clutch is thrown out of action, substantially as shown and described.

2. In a band-cutter and grain-feeder, the combination with a conveyer inclined downward at its inner or delivery end, of a second conveyer arranged opposite to such delivery end and adapted to swing in a vertical plane as described, parallel upper and lower shafts on which the said swinging conveyer runs, the said shafts being extended as shown and described, means for driving such upper shaft, a clutch mechanism applied to said shaft, and means interposed between the clutch and the lower shaft of the conveyer for throwing the clutch out of action, and gearing for driving the conveyer at a slower speed when the clutch is released, substantially as shown and described.

3. In a band-cutter and grain-feeder, the combination with a drive-shaft, a conveyer inclined downward at its inner or delivery end, and a second conveyer arranged contiguous and opposite to the delivery end of the first-named conveyer, and adapted to swing in a vertical plane as specified, a supplemental drive-shaft whereon such swinging conveyer runs, the said drive-shaft being extended outward from the conveyer as shown and described, gearing connecting the two drive-shafts, a clutch mechanism for throwing such gearing into or out of action, means connecting the clutch with the lower swinging end of the second conveyer, and other gearing applied to the respective shafts for driving the conveyer at a slower speed when the clutch is released, substantially as shown and described.

4. In a band-cutter and grain-feeder, the combination, with a conveyer, of a second conveyer adapted to swing in a vertical plane adjacent to the delivery end of the first conveyer, a drive-shaft supporting the swinging conveyer and extended laterally therefrom, a sprocket-wheel mounted loose thereon, a friction-wheel secured to said gear and adapted to rotate therewith, a collar fixed on the shaft, levers pivoted thereto and having friction-pads adapted to engage said wheel, a slide for shifting said lever for disengaging the clutch, a shaft extended from the lower end of the swinging conveyer, a rocking crank-shaft arranged between and operatively connecting the aforesaid slide with such extended shaft, a drive-shaft arranged parallel to the conveyer-shaft and having a small sprocket from which a chain runs to the loose sprocket before mentioned, a fast and loose ratchet-wheel arranged on the drive-shaft, a large sprocket-wheel keyed on the conveyer drive-shaft, and a chain connecting it with the loose ratchet, substantially as shown and described, whereby, when an overload of grain forces backward the lower end of the swinging conveyer, the clutch will be released and thereby throw the usual driving-gear out of action, and thus allow the supplemental driving-gear to come into action and drive the swinging conveyer at a slower speed.

JOHN LUNZ.

Witnesses:
JOHN HAFNER,
WILLIAM L. CONKLE.